United States Patent
May et al.

[11] Patent Number: 6,057,639
[45] Date of Patent: May 2, 2000

[54] PHOTOEMISSION APPARATUS WITH SPATIAL LIGHT MODULATOR

[75] Inventors: Paul May; Graham J. Woodgate; David Ezra, all of Oxon, United Kingdom

[73] Assignee: Sharp Kabushiki Kaisha, Osaka, Japan

[21] Appl. No.: 08/110,064

[22] Filed: Aug. 20, 1993

[30] Foreign Application Priority Data

Aug. 21, 1992 [GB] United Kingdom ............... 9217884

[51] Int. Cl.⁷ ................................................ H01J 31/50
[52] U.S. Cl. ........................................ 313/371; 313/524
[58] Field of Search ........................... 313/524, 525, 313/526, 528, 529, 536, 537; 318/365, 371, 372

[56] References Cited

U.S. PATENT DOCUMENTS

| | | | |
|---|---|---|---|
| 3,688,145 | 8/1972 | Coles | 313/524 |
| 3,879,700 | 4/1975 | Barkhoudarian | 340/5 MP |
| 3,989,971 | 11/1976 | Santilli et al. | 313/530 |
| 4,020,376 | 4/1977 | Bosserman et al. | 313/103 CM |
| 4,147,932 | 4/1979 | Lewis | 250/330 |
| 4,171,480 | 10/1979 | Wulms | 313/524 |
| 4,546,248 | 10/1985 | Craig et al. | 250/225 |
| 4,698,496 | 10/1987 | Dolizy | 313/524 |
| 4,957,351 | 9/1990 | Shioji | 350/348 |
| 5,059,854 | 10/1991 | Smits | 313/524 |

FOREIGN PATENT DOCUMENTS

| | | | |
|---|---|---|---|
| 0259878 | 3/1988 | European Pat. Off. | |
| 0126236 | 10/1951 | Japan | 313/524 |
| 0106356 | 8/1981 | Japan | 313/524 |
| 3269937 | 12/1991 | Japan | 313/525 |
| 1387712 | 3/1975 | United Kingdom | |
| 1407156 | 9/1975 | United Kingdom | |
| 2213985 | 8/1989 | United Kingdom | |
| WO8703770 | 6/1987 | WIPO | |

OTHER PUBLICATIONS

Search Report for European Appl. 9330656.0 Mailed Dec. 22, 1993.

Sawaki, "Sampling Steak Tubes Gives Oscilloscope a Brighter Future," Aug. 1988, No. 260, pp. 58–60, JEE.

Primary Examiner—Michael H. Day
Attorney, Agent, or Firm—Renner, Otto, Boisselle & Sklar

[57] ABSTRACT

A photoemission apparatus includes a spatial light modulator (2) and an integral photoemitter (5). A lens array (1) focuses light through the spatial light modulator (2) onto the photoemitter. Electrons emitted by the photoemitter (5) are deflected electrostatically by electrodes (10) and are accelerated through a screening mesh (8) onto a phosphor screen (6). Light emitted by the screen (6) passes through a further lens array (7).

24 Claims, 2 Drawing Sheets

PHOTOEMISSION APPARATUS WITH SPATIAL LIGHT MODULATOR

TECHNICAL FIELD OF THE INVENTION

The present invention relates to a photoemission apparatus, for instance in the form of an integrated SLM/photoemission device.

BACKGROUND OF THE INVENTION

GB 1407156 discloses a device for converting an acoustic pattern into a visual image. The device comprises a piezo electric transducer for converting an incident acoustic pattern into a corresponding change pattern. A photocathode disposed on the transducer is uniformly illuminated by suitable electromagnetic radiation and produces a spatial distribution of electron energies corresponding to the acoustic pattern. A grid passes higher energy electrons to an electron multiplier, from which the electrons are accelerated to a phosphorescent screen and final anode.

GB 1387712 discloses an electro-optical relay in which a visual image is converted by a photoemitter into a corresponding electron image which is stored in a plate of ferroelectric double refraction material. The image can subsequently be read by illuminating the ferroelectric plate.

EP 0259878 discloses an electron emission element in which a spatial light modulator (SLM) formed by a liquid crystal device is associated with a semiconductor photoemitter. The SLM controls the passage of light to the photoemitter, which emits electrons in accordance with the pattern of illumination thereof.

WO 87/03770 discloses a colour display in which red, green, and blue image are produced by three cathode ray tubes. The images are combined by being spatially multiplexed on a photocathode.

WO 87/03770 discloses a colour display in which monochrome cathode ray tubes (CRT) produce images corresponding to the red, green, and blue components of a composite image. The CRT images are spatially multiplexed on a photocathode which emits electrons to a segmented phosphor screen having red, green, and blue phosphors so as to provide a colour image.

U.S. Pat. No. 4,957,351 discloses a stereo image display device in which a spatial light modulator cooperates with a lens array to produce an autostereoscopic image.

U.S. Pat. No. 4,546,248 discloses a television camera in which the brightness of images of a scene is attenuated as necessary so as to fit within the dynamic range of the system. The output of a video sensor controls the intensity of a CRT image which is imaged onto a light valve. The light valve controls the attenuation of light from the scene supplied to the video sensor. Thus, the attenuation is adjusted in accordance with the instantaneous intensity of the scene.

U.S. Pat. No. 4,147,932 discloses a low-light and infrared viewing system in which a photoemitter converts an optical image into an electron image. The electron image is intensified and interacts with electrophoretic particles to produce an intensified visible image.

U.S. Pat. No. 4,020,376 discloses a helmet-mounted display in which an input image is converted to an electron image by a photocathode. The electron image is intensified and converted back to a visible image by a phosphor screen.

SUMMARY OF THE INVENTION

According to a first aspect of the invention, there is provided a photoemission apparatus comprising a spatial light modulator and a photoemitter for emitting electrons in response to optical radiation received via the spatial light modulator, characterized by further comprising electron deflection means for deflecting electrons emitted by the photoemitter.

It is thus possible to provide an apparatus which allows a uniformly illuminating optical source to be modulated, for instance in two-dimensions, by an optical SLM and for the optical information to be converted into the electron domain. The ability of electrons to interact easily, for instance with magnetic and electrostatic fields, allows a two dimensional electron array to be manipulated in various useful and advantageous ways.

In order to provide an integrated device, the photoemitter may be formed on a first surface of the SLM. The SLM may, for instance, comprise a liquid crystal device (LCD), for instance of the twisted nematic or ferroelectric liquid crystal type. Such an arrangement may be used for lithographic applications where a demagnified electron image of the optical image formed by the SLM may be formed by the application of appropriate focusing and accelerating fields. Thus, it is unnecessary to fabricate a mask for lithography; instead, the lithographic image can be translated directly from the SLM to a demagnified electron image in the form of a spatially modulated electron beam. The resolution achievable with electron beam lithography (<100 Å) can be utilised without the need for forming masks. Further, a plurality of contiguous lithographic images may be formed by the SLM with appropriate deflection or movement of the electron beam between images and/or with mechanical deflection or movement so as to form a composite on the lithographic substrate.

A first array of lenses, such as a microlens array of spherical elements or a lenticular screen of cylindrical elements, may be provided for focusing optical radiation through the SLM onto the photoemitter. The array may be formed on or attached to a second surface of the SLM.

Magnetic or electrostatic deflection means may be provided for deflecting electrons emitted by the photoemitter. For instance, for electrostatic deflection, electrodes may be formed within the photoemitter for producing lateral electrostatic fields. The photoemitter and electrostatic deflection means may be formed in a single layer so as to provide a compact apparatus in which relatively small deflection voltages are sufficient for deflection of the electrons.

A phosphor screen may be spaced from the photoemitter by a vacuum, for instance with the screen comprising an acceleration anode, so as to convert the electrons emitted by the photoemitter into optical radiation, such as monochromatic or polychromatic light. Such an arrangement allows a 2D or 3D display to be provided with the advantage of permitting manipulation of the final optical image by manipulating the electron beams which are incident on the phosphor screen. Although such a display has reduced efficiency compared with displays in which there is no conversion to the electron domain, the brightness may be increased compared with such known displays. Thus, although a display of this type is less desirable for portable battery-powered equipment, it may have applications, for instance, in flat screen television, where a supply of mains power is available, so as to provide a brighter picture. Also, for a colour display, red, green and blue colours may be provided by phosphor dots on the screen, thus obviating the need for a complex filter using conventional liquid crystal display technology.

In order to screen the electrostatic deflection means from the relatively high accelerating potential at the phosphor screen, a screening mesh may be disposed between the photoemitter and the phosphor screen. This allows deflection to be achieved in a relatively small initial accelerating field defined between the photoemitter and the screening mesh. Electrons passing through the screening mesh may then be accelerated by the relatively large accelerating anode voltage at the phosphor screen in order to achieve relatively high light outputs.

A second array of lenses may be formed on or attached to the phosphor screen. The second array may comprise a microlens array of spherical lenses or a lenticular screen of cylindrical lenses. Such an arrangement may be used for 3D displays in which a plurality of 2D views are formed in sequence by the SLM and the corresponding electron beams are laterally deflected for the different views so as to form temporally multiplexed images on the phosphor screen. The second lens array then converts the views into output light beams at different angles of emission from the screen so that an observer perceives an autostereoscopic image.

Such a photoemission apparatus may be used in image processing applications, where parallel manipulation of the electron beams may be useful.

The photoemitter may comprise a bialkali or caesiated gallium arsenide photocathode which can be directly deposited on glass. Such photocathodes have efficiencies close to 30% over the visible spectrum. However, photo-assisted field emission from other semiconductor structures and photoemission from metal layers are also possible.

According to a second aspect of the invention, there is provided a photoemission apparatus comprising a spatial light modulator, a photoemitter for emitting electrons in response to optical radiation received via the spatial light modulator, and a phosphorescent screen and acceleration anode spaced from the photoemitter by a vacuum, characterized in that the phosphorescent screen comprises a plurality of regions for emitting different colours and the spatial light modulator comprises a plurality of picture elements each of which is aligned with a respective region of the phosphorescent screen.

DESCRIPTION OF THE DRAWINGS

The invention will be further described, by way of example, with reference to the accompanying drawings, in which.

DETAILED DESCRIPTION OF THE PREFERRED EMBODIMENTS

Figure 1:
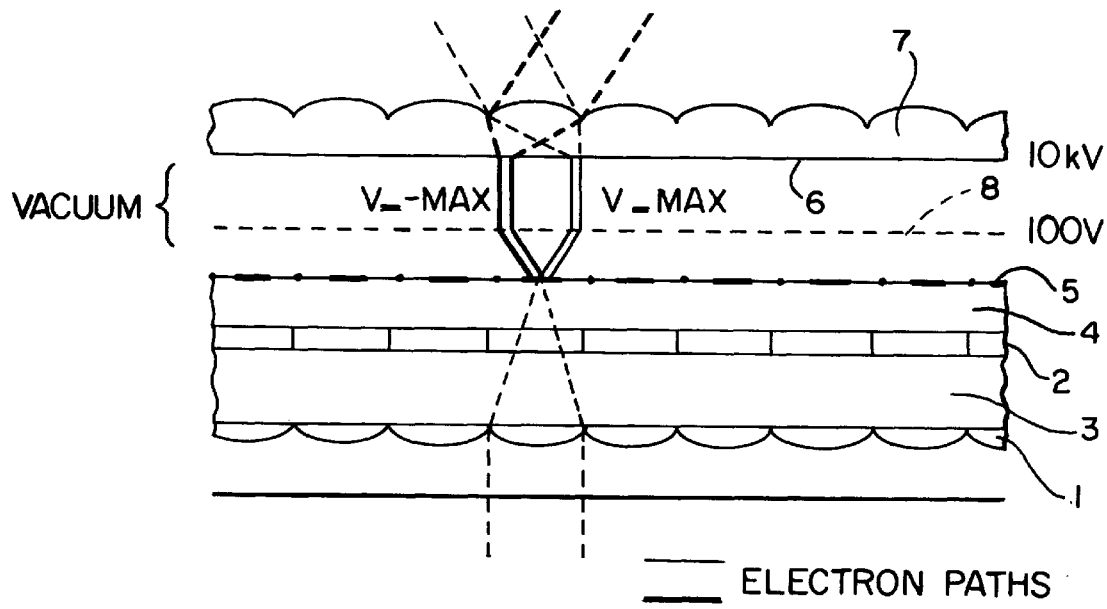
FIG. 1 a schematic cross-sectional view of a 3D display constituting a first embodiment of the invention.

The same reference numerals refer to corresponding parts in the drawings.

The integrated device shown in FIG. 1, comprises a microlens array 1 formed on or attached to a rear surface of a liquid crystal device comprising a pixellated liquid crystal layer 2 sandwiched between glass layers 3 and 4. The upper surface (with the device orientated as shown in FIG. 1) of the glass layer 4 has formed thereon a photoemission layer 5 which is spaced from a phosphor screen 6 by a vacuum. A lenticular screen 7 is formed on or attached to the upper surface of the phosphor screen 6. A conductive screening mesh 8 is disposed between the photoemission layer 5 and the phosphor screen 6.

Figure 2:
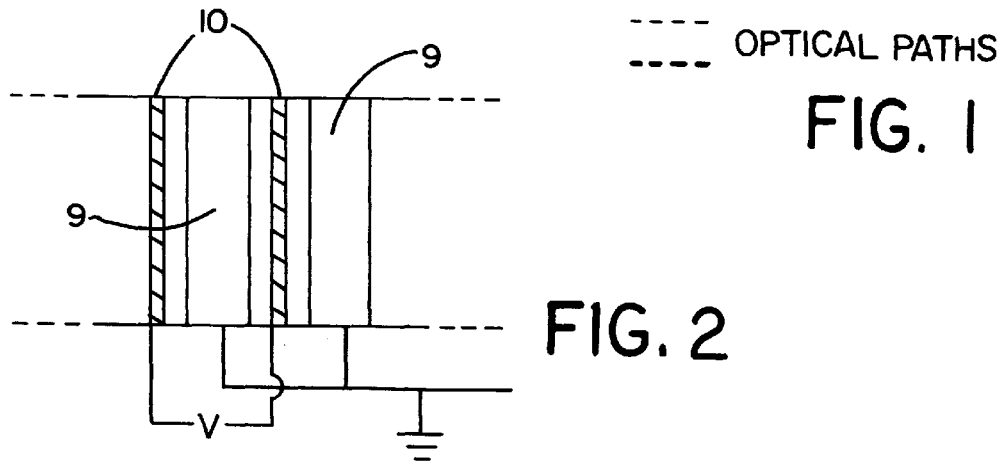
FIG. 2 is a schematic plan view to a larger scale of a photoemission layer of FIG. 1.

As shown in greater detail in FIG. 2 the photoemission layer 5 comprises a plurality of regions 9 of photoemissive material which are connected to ground or earth potential. Electrodes 10 are formed between the regions 9 and are connected to receive a lateral deflecting voltage V which is symmetrical about earth potential for laterally deflecting electron beams emitted from the regions 9.

As shown in FIG. 1 the photoemission layer 5 is screened from the 10 kilovolt accelerating potential at the phosphor screen 6 by the screening mesh 8 which is connected to a 100 volt source. Thus, a lateral deflecting voltage having a magnitude of the order of 10 volts is sufficient to deflect the electron beams emitted from the regions 9.

In use, the rear surface of the integrated device is illuminated by collimated light from a suitable back-light arrangement. Each lens of the array 1 focuses light through a corresponding light-modulating cell of the SLM formed by the liquid crystal layer 2 onto the corresponding photoemissive region 9 of the photoemission layer 5. The region 9 emits electrons which are formed into a beam and laterally deflected in the region of space between the photoemission layer 5 and the screening mesh 8. Once the electrons pass through the screening mesh 8, they are accelerated towards the phosphor screen 6 where the electrons excite the phosphor to emit light. The light is then converted into substantially parallel output light beams by each corresponding lenticule of the screen 7.

The liquid crystal layer 2 forms in sequence a plurality of views which together form a 3D image. Each view is converted into corresponding electron beams with the beams for the different views being deflected laterally between the extreme positions illustrated by the electron paths in FIG. 1. The laterally displaced images formed by the phosphor screen 6 are then imaged into the different optical paths, two of which are shown in FIG. 1 for the extreme lateral deflections of the electron beams. Thus, the views are perceived by an observer in the directions corresponding to those from which the views were taken during image capture.

The liquid crystal layer 2 may comprise any suitable liquid crystal, such as twisted nematic or ferroelectric liquid crystal. In the case of ferroelectric liquid crystal, some form of multiplexing may be necessary in order to achieve an adequate "grey scale". For instance, where speed of response permits, temporal multiplexing may be adopted. In particular, each image may be supplied several times to the liquid crystal layer with each pixel being activated for a number of times for each image corresponding to the desired luminance of that pixel. Alternatively or additionally, where spatial resolution permits, several pixels of the liquid crystal layer may be allocated to each pixel of the image and the number of activated pixels of the device corresponding to the desired luminosity.

Figure 3:
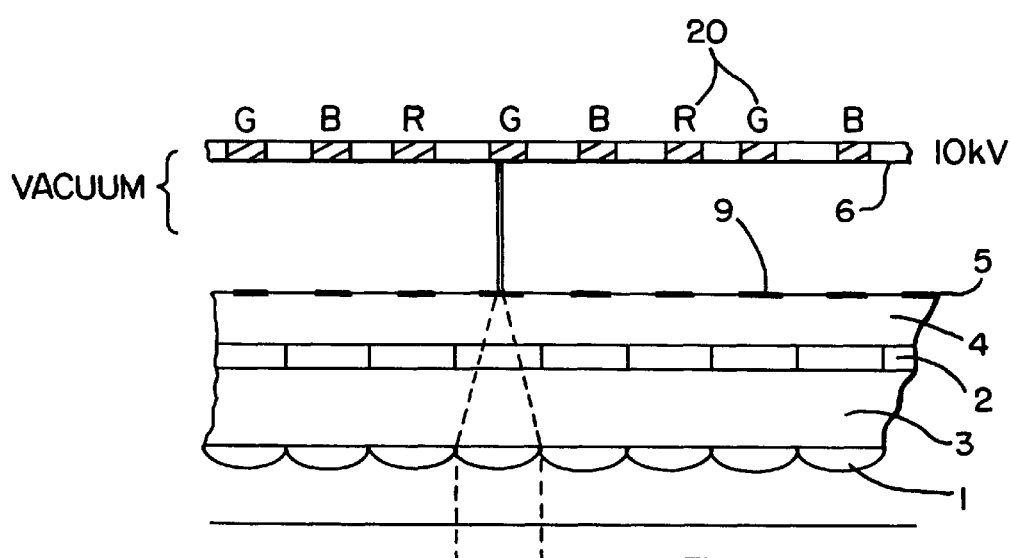
FIG. 3 is a schematic cross-sectional view of a 2D display constituting a second embodiment of the invention.

The display shown in FIG. 3 differs from that shown in FIG. 1 in that it is arranged to provide a 2D colour display. Thus, the deflection electrodes 10, the screening mesh 8, and the screen 7 are omitted, whereas the phosphor screen 6 comprises red, green, and blue (RGB) phosphor dots 20. Each of the dots 20 is aligned with a respective photoemissive region 9 of the layer 5, a respective pixel of the liquid crystal layer 2, and a respective lens of the array 1. Each coloured picture element of the image to be displayed thus corresponds to three of the dots 20. In use, light is focused by the lenses of the array 1 through the pixels of the liquid crystal layer 2, which modulate the intensity of light in accordance with the corresponding colour component of the image picture element, onto the photoemissive region 9. Electrons emitted by the region 9 are accelerated towards the anode and excite the phosphor dots of the screen 6 to emit light of the corresponding colour. No electron deflection is required in this display, but the resolution of the image produced on the screen 6 is one third of the spatial resolution of the pixels of the liquid crystal layer 2.

Figure 4:
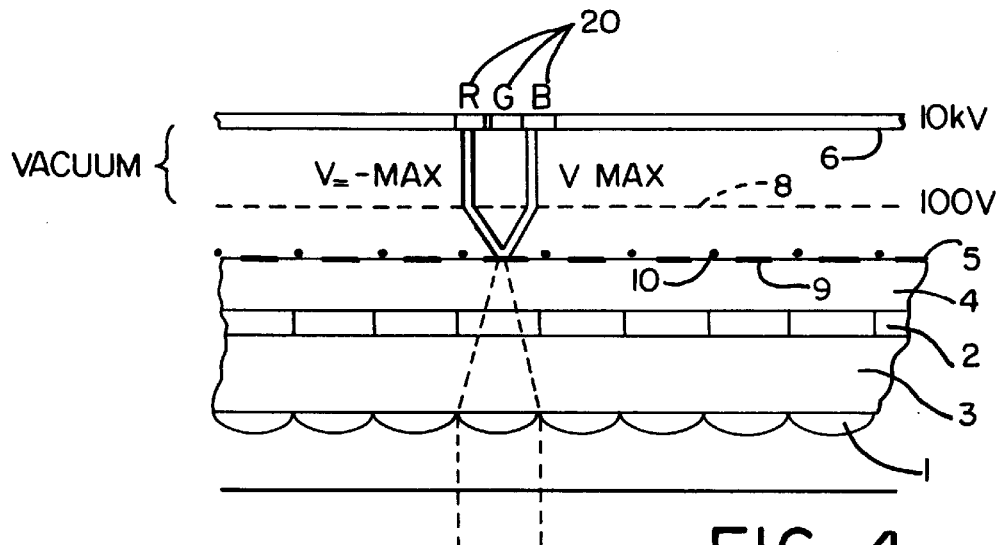
FIG. 4 is a schematic cross-sectional view of another 2D display constituting a third embodiment of the invention.

FIG. 4 shows another 2D display which differs from the display of FIG. 1 in that the screen 7 is omitted and the phosphor screen 6 comprises a plurality of RGB phosphor dots 20 similar to those shown in FIG. 3. However, the RGB dots 20 in FIG. 4 are grouped together in groups of three with each group corresponding to a respective photoemissive region 9 of the layer 5, a respective cell of the liquid crystal layer 2, and a respective lens of the array 1.

In use, the red, green, and blue components of each pixel of the image are supplied in sequence to the corresponding cell of the liquid crystal layer 2. The electrons emitted by the corresponding region 9 are deflected to the RGB spots 20 in turn by the electrostatic field produced by the electrodes 10. In the arrangement shown in FIG. 4, when the deflection voltage V is at a negative maximum value, the electrons emitted by the region 9 are directed to the red phosphor dot so as to reproduce the red component of the picture element. The deflection voltage V is reduced to zero for directing electrons towards the green phosphor dot and is set at its maximum positive value to direct electrons to the blue phosphor dot. Thus, the display of FIG. 4 retains the resolution of the pixels of the liquid crystal layer 2 by performing temporal multiplexing but the image frame rate is restricted by the need to switch the liquid crystal layer 2 between the red, green, and blue components of the image to be displayed.

In the case of a monochrome display, the arrangement shown in FIG. 4 may be modified to increase the spatial resolution by means of temporal multiplexing. The RGB phosphor dots may be replaced by a continuous monochrome phosphor and the deflection arrangement used to excite different parts of the phosphor for consecutive time slots.

Figure 5:
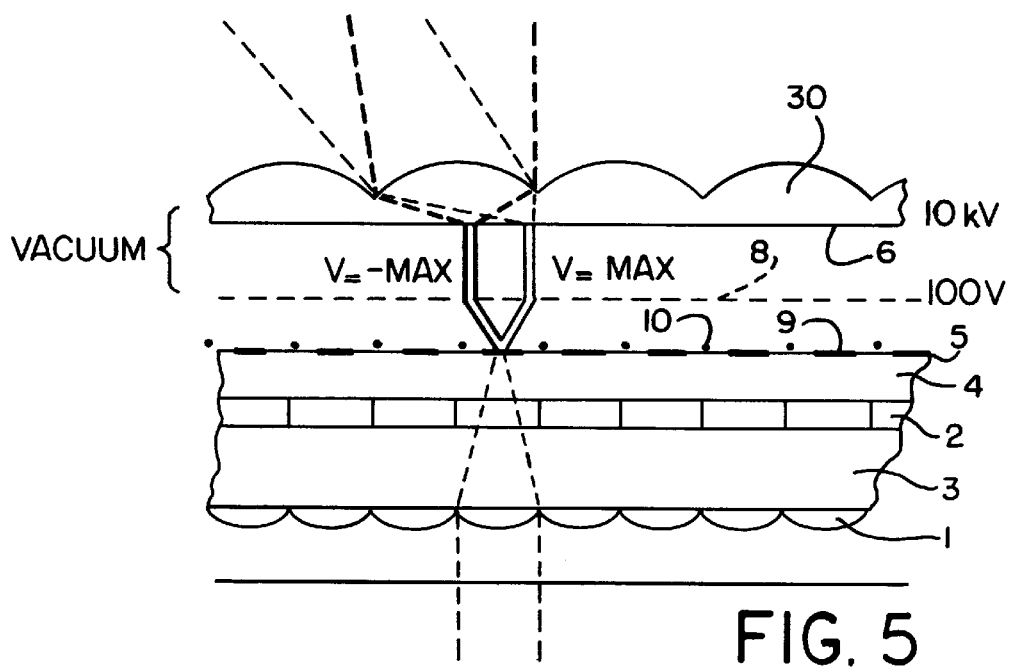
FIG. 5 is a schematic cross-sectional view of another 3D display constituting a fourth embodiment of the invention.

FIG. 5 shows a 3D display which differs from that of FIG. 1 in that combined temporal and spatial multiplexing are used to increase the number of views which can be provided to simulate a 3D image. The lenticular screen 7 of FIG. 1 is replaced by a lenticular screen 30 comprising lenticules having a pitch which is substantially equal to twice the pitch of the pixels of the liquid crystal layer 2. Thus, each lenticule of the screen 30 is aligned with two regions 9 of the photoemissive layer 5, two pixels of the liquid crystal layer 2, and two lenses of the array 1.

FIG. 5 shows the light and electron paths for one of the pixels of the liquid crystal layer 2 and illustrates the output light beam directions for the maximum positive and negative deflection voltages V. Thus, by using the electron deflection capabilities of this display, temporal multiplexing may be used to recreate views in different directions of the 3D image to be displayed. However, by simultaneously presenting elements of two views to the two pixels of the layer 2 aligned with each lenticule of the screen 30, the number of views which are displayed simultaneously is doubled. However, the spatial resolution of the display of FIG. 5 is halved with respect to that of the display of FIG. 1.

Figure 6:
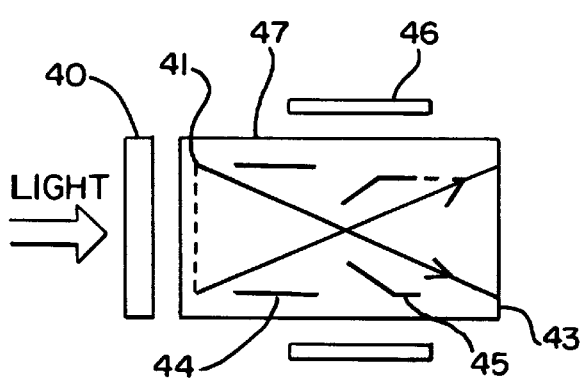
FIG. 6 is a schematic diagram of a display constituting a fifth embodiment of the invention.

FIG. 6 illustrates schematically an apparatus which may be used to process images in the electron domain. A spatial light modulator 40 modulates incident light with a stored image and the modulated light is directed on to a photoemissive layer 41. The elements 40 and 41 may be embodied by the elements 11 to 5 as shown in, for instance, FIG. 1.

A phosphor screen 43 is spaced from the photoemissive layer 41 by a vacuum and may comprise a monochrome phosphor screen or a multi-colour phosphor screen, for instance comprising RGB phosphor dots. First and second electrostatic lenses 44 and 45 are located between the photoemissive layer 41 and the phosphor screen 43, and are arranged to invert the "electron image" produced by the layer 41 so that the visible image produced by the screen 43 is inverted with respect to the image stored in the spatial light modulator 40.

A magnetic coil 46 surrounds and is coaxial with a tube 47 containing the layer 41 and the lenses 44 and 45. The coil 46 thus produces a solenoidal magnetic field when current passes through the coil, which field rotates the "electron image" formed by the layer 41. Thus, the visible image produced by the phosphor screen 43 can be rotated as desired with respect to the image stored in the spatial light modulator 40.

Figure 7:
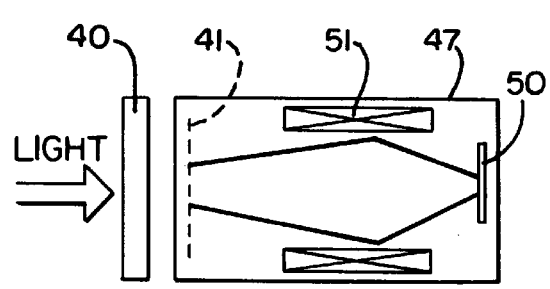
FIG. 7 is a schematic diagram of a lithography apparatus constituting a sixth embodiment of the invention.

The photoemission lithography apparatus shown in FIG. 7 comprises a spatial light modulator 40 and photoemissive layer 41 corresponding to those shown in FIG. 6. The layer 41 and a sample 50 to be subjected to photolithography are located within an evacuated tube 47 similar to that shown in FIG. 6. A magnetic lens 51 acts as an electron lens and causes a demagnified electron image to be created at the sample 50. Thus, the electrons striking the surface of the sample 50 form a demagnified electron image of the image stored by the spatial light modulator 40.

What is claimed is:

1. A photoemission apparatus comprising:
   a spatial light modulator,
   a photoemitter for emitting electrons in response to optical radiation received via the spatial light modulator, and
   an electron deflection means for deflecting electrons emitted by the photoemitter.

2. A photoemission apparatus according to claim 1, wherein the electron deflection means comprise electrodes formed adjacent to the photoemitter for producing lateral electrostatic fields.

3. A photoemission apparatus according to claim 1, further comprising a first array of lenses arranged to focus optical radiation through the spatial light modulator onto the photoemitter.

4. A photoemission apparatus according to claim 3, wherein the spatial light modulator comprises a plurality of picture elements, each of which is aligned with a respective lens of the first array.

5. A photoemission apparatus according to claim 4, further comprising a phosphorescent screen and an acceleration anode spaced from the photoemitter by a vacuum.

6. A photoemission apparatus according to claim 5, further comprising a screening electrode disposed between the photoemitter and the acceleration anode.

7. A photoemission apparatus according to claim 6, further comprising a second array of lenses for receiving light from the phosphorescent screen.

8. A photoemission apparatus according to claim 7, wherein each lens of the second array is aligned with a respective picture element of the spatial light modulator.

9. A photoemission apparatus according to claim 5, wherein the phosphorescent screen comprises a plurality of groups of regions, the regions of each group being arranged to emit different colors, each group being aligned with a respective picture element of the spatial light modulator, and the deflection means being arranged to deflect electrons selectively to the regions of the groups.

10. A photoemission apparatus according to claim 7, wherein each lens of the second array is aligned with a respective group of picture elements of the spatial light modulator.

11. A photoemission apparatus according to claim 1, wherein the electron deflection means comprises at least one electrostatic lens.

12. A photoemission apparatus according to claim 11, further comprising a phosphorescent screen and an acceleration anode spaced from the photoemitter by the vacuum.

13. A photoemission apparatus according to claim 1, wherein the electron deflection means comprises at least one magnetic lens.

14. A photoemission apparatus according to claim 13, wherein the magnetic lens is arranged to produce a demagnified electron image.

15. A photoemission apparatus according to claim 13, further comprising a phosphorescent screen and an acceleration anode spaced from the photoemitter by a vacuum.

16. A photoemission apparatus according to claim 1, further comprising an electro-magnetic coil for producing a solenoid magnetic field whose axis is substantially parallel to the paths of electrons emitted by the photoemitter.

17. A photoemission apparatus according to claim 1, wherein said spatial light modulator, said photoemitter, and said electron deflection means are generally oriented in parallel layers.

18. A photoemission apparatus according to claim 17, further comprising a phosphorescent screen onto which said deflected electrons are incident, said phosphorescent screen being generally parallel to said parallel layers.

19. A photoemission apparatus according to claim 18, said apparatus being in the form of an integrated device.

20. A photoemission apparatus according to claim 17, wherein the electron deflection means comprise electrodes formed adjacent to the photoemitter for producing lateral electrostatic fields.

21. A photoemission apparatus, comprising:

a spatial light modulator, a photoemitter for emitting electrons in response to optical radiation received via the spatial light modulator, an electron deflection means for deflecting electrons emitted by the photoemitter, wherein said spatial light modulator, said photoemitter, and said electron deflection means are generally oriented in parallel layers, and wherein the electron deflection means and the photoemitter are formed in a common layer.

22. A photoemission apparatus comprising:

a spatial light modulator, a photoemitter for emitting electrons in response to optical radiation received via the spatial light modulator, and a phosphorescent screen and acceleration anode spaced from the photoemitter by a vacuum, wherein the phosphorescent screen comprises a plurality of regions for emitting different colors and the spatial light modulator comprises a plurality of picture elements each of which is aligned with a respective region of the phosphorescent screen.

23. A photoemission apparatus according to claim 22, further comprising an array of lenses, each of which is arranged to focus optical radiation through a respective picture element of the spatial light modulator onto the photoemitter.

24. A photoemission apparatus, comprising:

a spatial light modulator, a photoemitter for emitting electrons in response to optical radiation received via the spatial light modulator, and an electron deflection means for deflecting electrons emitted by the photoemitter, wherein the electron deflection means and the photoemitter are formed in a single layer.

* * * * *